(12) United States Patent
Mc Donald et al.

(10) Patent No.: US 7,137,773 B1
(45) Date of Patent: Nov. 21, 2006

(54) MODEL-BASED STATISTICAL PROCESS TO DETERMINE DIAGNOSTIC LIMITS IN A SENSOR POSITION SYSTEM FOR A TURBOCHARGER

(75) Inventors: Mike M. Mc Donald, Macomb, MI (US); Richard B. Jess, Haslett, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 12 days.

(21) Appl. No.: 11/129,854

(22) Filed: May 16, 2005

(51) Int. Cl.
*F02D 23/02* (2006.01)
(52) U.S. Cl. ............................ 415/1; 415/118; 415/165; 60/600
(58) Field of Classification Search .................... 415/1, 415/118, 159, 160, 163, 165; 60/600, 601, 60/602, 603
See application file for complete search history.

(56) References Cited

U.S. PATENT DOCUMENTS

| 4,067,661 | A | * | 1/1978 | Gebhart et al. | ............. 415/118 |
| 5,346,359 | A | * | 9/1994 | Propst | ........................... 415/1 |
| 6,427,445 | B1 | * | 8/2002 | Isaac et al. | ................... 60/602 |
| 6,681,573 | B1 | * | 1/2004 | Arnold | ........................ 60/602 |

* cited by examiner

*Primary Examiner*—Igor Kershteyn
(74) *Attorney, Agent, or Firm*—Christopher DeVries

(57) ABSTRACT

A method of determining diagnostic limits for a vane position sensing system installed in a variable nozzle turbocharger (VNT). The method includes defining mechanical input probability distribution functions (PDFs) of the VNT, describing the vane position sensing system in terms of component models and defining component parameter PDFs for parameters associated with the component models. Vane position signal PDFs based are generated on the mechanical input PDFs, the component models and the component parameter PDFs, and diagnostic limits are set for the vane position sensing system based on the vane position signal PDFs.

22 Claims, 4 Drawing Sheets

MODEL-BASED STATISTICAL PROCESS TO DETERMINE DIAGNOSTIC LIMITS IN A SENSOR POSITION SYSTEM FOR A TURBOCHARGER

FIELD OF THE INVENTION

The present invention relates to position sensing diagnostics, and more particularly to establishing calibration limits and performing diagnostics for a position sensor in a turbocharger.

BACKGROUND OF THE INVENTION

Turbocharged engines commonly include an exhaust driven turbocharger that increases engine output by increasing airflow to the cylinders. As a result, turbocharged engines provide increased horsepower over equivalently sized naturally aspirated engines.

One turbocharger design includes a variable nozzle turbocharger (VNT). VNT's include variable position vanes that regulate the amount of air delivered through the VNT. The vane position ranges from a fully-open position to a fully-closed position. In the fully-closed position, the VNT delivers a maximum amount of airflow to the engine. In the fully-open position, the VNT delivers a minimum amount of airflow to the engine. The vanes can be positioned between the fully-open and fully-closed positions to provide an intermediate amount of airflow to the engine. A vane actuator adjusts the vane position based on a control signal and a vane position sensor generates a signal indicating the actual vane position for feedback control.

Diagnostics are performed to ensure proper operation of the VNT and the vane position sensor. Traditionally, diagnostic limits are established for the fully-open and fully-closed positions. These diagnostic limits are initially established based on VNT specifications and physical system level measurements using test and development of systems/components. The diagnostic limits may be adjusted through trial and error test methods. As a result, the diagnostic limits typically do not properly account for VNT aging effects, interacting effects of the position sensor with a controller or for manufacturing variation. Further, traditional diagnostics do not include diagnostic limits for the range or span between the fully-open and fully-closed positions.

SUMMARY OF THE INVENTION

Accordingly, the present invention provides a method of determining diagnostic limits for a vane position sensing system installed in a variable nozzle turbocharger (VNT). The method includes defining mechanical input probability distribution functions (PDFs) of the VNT, describing the vane position sensing system in terms of component models and defining component parameter PDFs for parameters associated with the component models. Vane position signal PDFs based are generated on the mechanical input PDFs, the component models and the component parameter PDFs, and diagnostic limits are set for the vane position sensing system based on the vane position signal PDFs.

In one feature, the step of generating vane position signal PDFs includes processing the component parameter PDFs and the component models using Monte Carlo Analysis (MCA).

In another feature, the component models include a control circuit model and a signal processing model and the step of defining the component parameter PDFs includes processing the control circuit model and the signal processing model using Monte Carlo Analysis (MCA).

In another feature, the step of generating the vane position signal PDFs includes processing the component parameter PDFs, a vane position sensor model, a wiring harness model, a control circuit model and a signal processing model using Monte Carlo Analysis (MCA).

In still other features, the step of setting the diagnostic limits includes determining a fully-open sensor position range based on the vane position signal PDFs and the mechanical input PDFs and determining a fully-closed sensor position range based on the vane position signal PDFs and the mechanical input PDFs. A span limit is defined between the fully-open and the fully-closed sensor position ranges based on resolution, control stability and allowable hysteresis.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
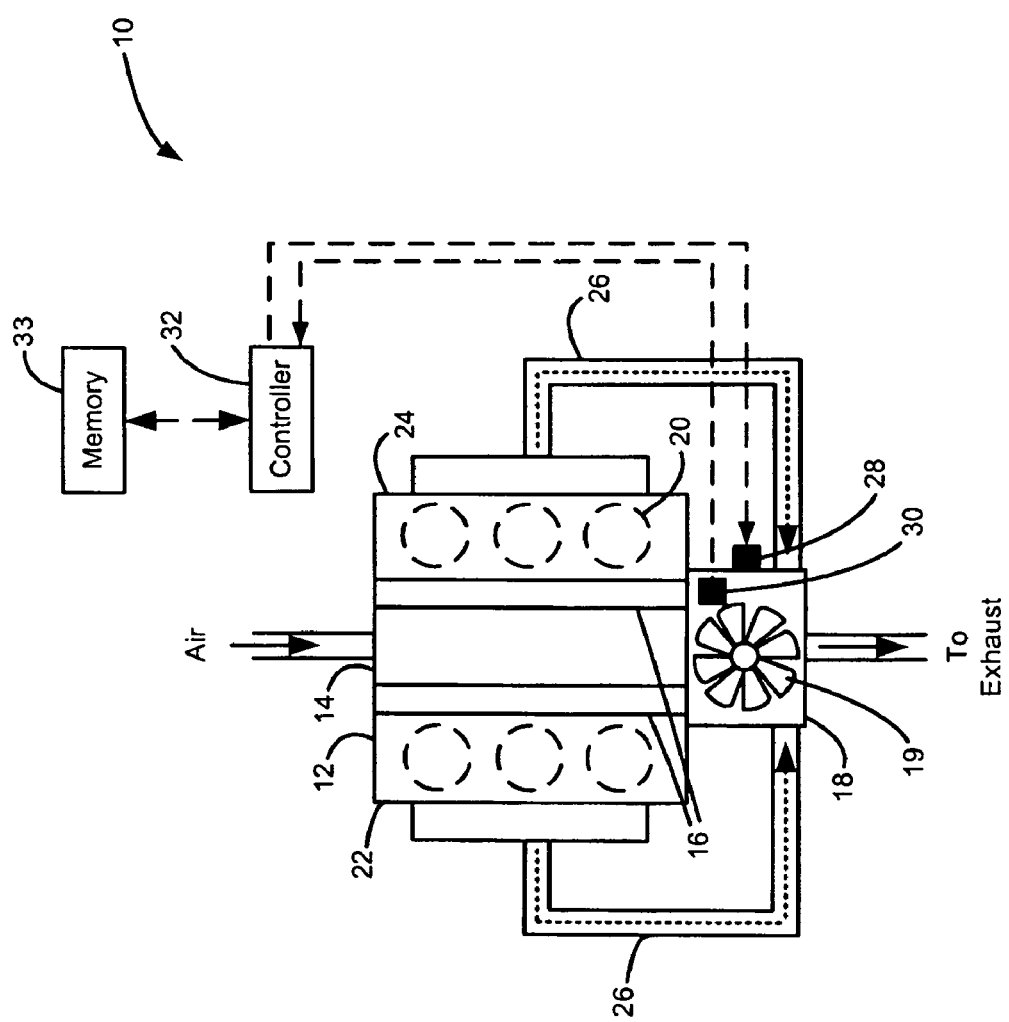
FIG. 1 is a schematic illustration of a vehicle engine system according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term Monte Carlo Analysis (MCA) refers to a statistical simulation method that directly simulates a physical system based on probability density functions (PDFs) of parameters that influence the system response. More specifically, the MCA randomly samples from each of the parameter PDFs and generates a series of solutions to the physical system. The solutions define a solution PDF for the physical system.

Referring now to FIG. 1, an exemplary engine system 10 is schematically illustrated in accordance with the present invention. The engine system 10 includes an engine 12, an intake manifold 14, a common rail fuel injection system 16 and a turbocharger 18. The exemplary engine 12 includes six cylinders 20 configured in adjacent cylinder banks 22,24 in V-type layout. Although FIG. 1 depicts six cylinders (N=6), it can be appreciated that the engine 12 may include additional or fewer cylinders 20. For example, engines having 2, 4, 5, 8, 10, 12 and 16 cylinders are contemplated. It is also anticipated that the engine 12 can have an inline-type cylinder configuration.

The inlet vacuum created by the engine intake stroke draws air into the intake manifold 14. Air is drawn into the individual cylinders 20 from the intake manifold 14 and is compressed therein. Fuel is injected with the air by the common rail injection system 16 and the heat of the compressed air and/or electrical energy ignites the air/fuel mixture. Exhaust gas is exhausted from the cylinders 20 through exhaust conduits 26. The exhaust gas drives the turbocharger 18, which delivers additional air into the cylinders 20 for combustion.

The turbocharger 18 is preferably a variable nozzle turbocharger (VNT). The turbocharger 18 includes a plurality of variable position vanes 19) that regulate the amount of air delivered. More specifically, the vanes are movable between a fully-open position and a fully-closed position. When the vanes are in the fully-closed position, the turbocharger 18 delivers a maximum amount of additional airflow into the engine 12. When the vanes are in the fully-open position, the turbocharger 18 delivers a minimum amount of additional airflow into the engine 12. The amount of delivered airflow is regulated by selectively positioning the vanes between the fully-open and fully-closed positions. The turbocharger 18 includes a vane actuator 28 that mechanically manipulates the vane position. A vane position sensor 30 generates a vane position signal based on the physical position of the vanes.

A controller 32 controls overall operation of the engine system 10. More specifically, the controller 32 controls engine system operation based on various parameters including, but not limited to, driver input, stability control and the like. The controller 32 can be described as an Engine Control Module (ECM). The controller 32 also performs engine system diagnostics, including the vane position system diagnostics according to the present invention. More specifically, the controller 32 regulates operation of the turbocharger 18 by communicating a command signal to the vane actuator 28. The vane position sensor 30 generates the vane position signal, which is processed by the controller 32 to determine whether the turbocharger 18 is operating as commanded.

The diagnostic limits are determined off-line and are pre-programmed into memory 33 associated with the controller 32. The diagnostic limits generally include a fully-open region of acceptable operation, a fully-closed region of acceptable operation and a span range of acceptable operation. More particularly, when commanding a fully-open position, if the vane position signal lies within the fully-open region, the vanes are deemed in the fully-open position. Similarly, when commanding a fully-closed position, if the vane position signal lies within the fully-closed region, the vanes are deemed in the fully-closed position. The span range indicates acceptable vane travel range between the fully-open and fully-closed regions. If the vane position signal is outside of the diagnostic limits, the vane position system is deemed faulty, as described in further detail below.

The diagnostic limit determinations are based on mathematical models of the components of the vane positioning system. The components include, but are not limited to, the vane position sensor, a wiring harness that provides power to and enables signal transfer between the vane position sensor and the controller 32. A signal processing function is also included. More particularly, probability distribution functions (PDFs) are provided for parameters of each of the models. Mechanical input PDFs are also provided and represent the physical position of the vanes when they are at the fully-open and fully-closed positions. The mechanical input PDFs are provided by the turbocharger manufacturer and are based on specifications and test data. The PDFs and component models are processed using Monte Carlo Analysis (MCA). The outputs of the MCA are vane position signal PDFs as interpreted by the controller 32.

The vane position sensor model accounts for expected product variation, temperature effects, aging effects and variation of a supplied reference voltage. The vane position sensor model parameters include, but are not limited to, sensor signal voltage, circuit output electrical impedance, circuit board temperature and position sensor temperature. The wiring harness model includes a simple resistance-based estimation of the wiring effects and accounts for electrical noise (i.e., EMI). The wiring harness model parameters include, but are not limited to, resistor values for each wire and connection and resistor values for fault modes (i.e., short to ground or open circuit).

The controller model accounts for variability in the sensor's analog to digital converter (A/D) reference voltages, circuit temperatures and quantization of signals supplied to the control circuit or software. The controller model parameters include, but are not limited to, circuit temperature, output voltage to the vane position sensor 30, output voltage to an analog input circuit (AIC), output voltage to a voltage supply monitor, circuit temperature of the voltage supply monitor, circuit temperature of the AIC, circuit electrical impedance of the AIC, AIC A/D converter jitter, A/D digital converter error quantity and voltage level supplied to the controller circuits.

Figure 2:
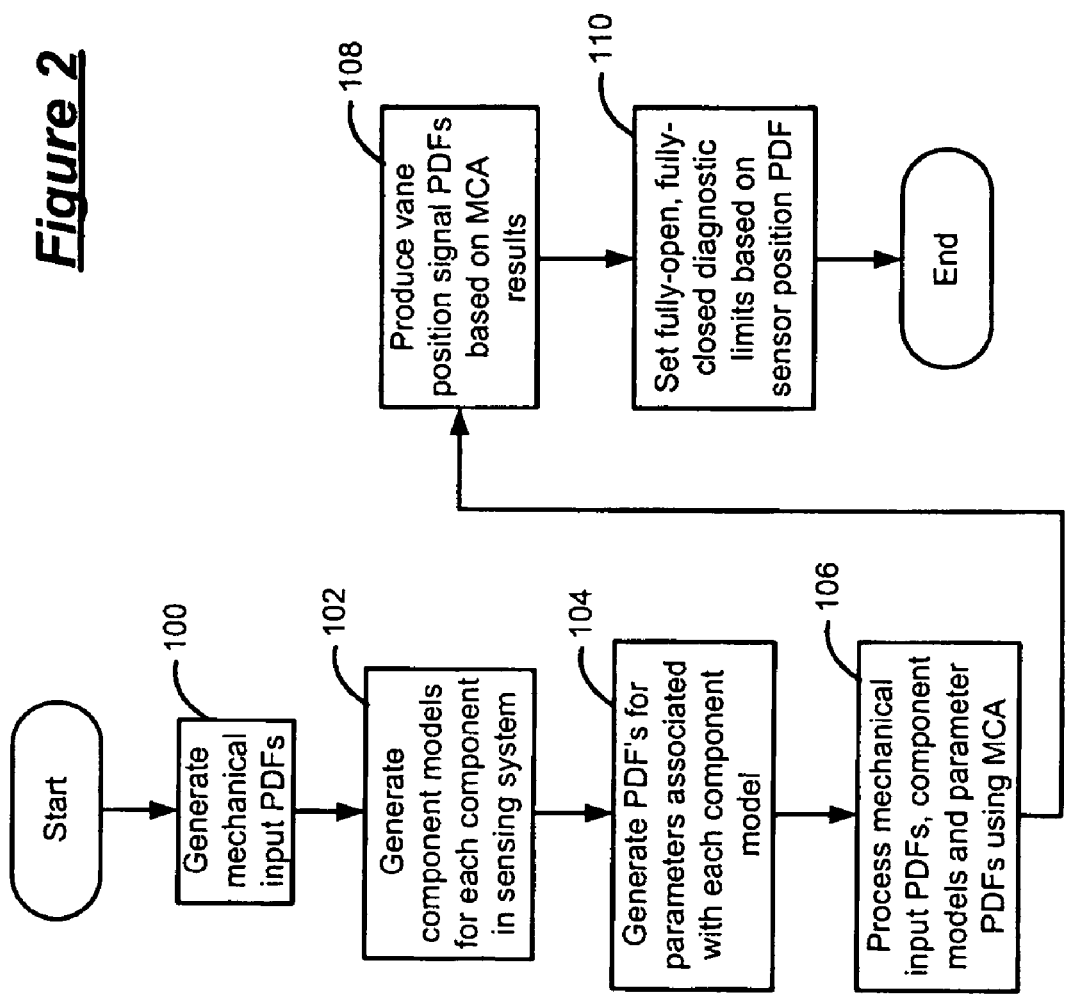
FIG. 2 is a flowchart illustrating steps of a diagnostic limit determination system according to the present invention.
Figure 3:
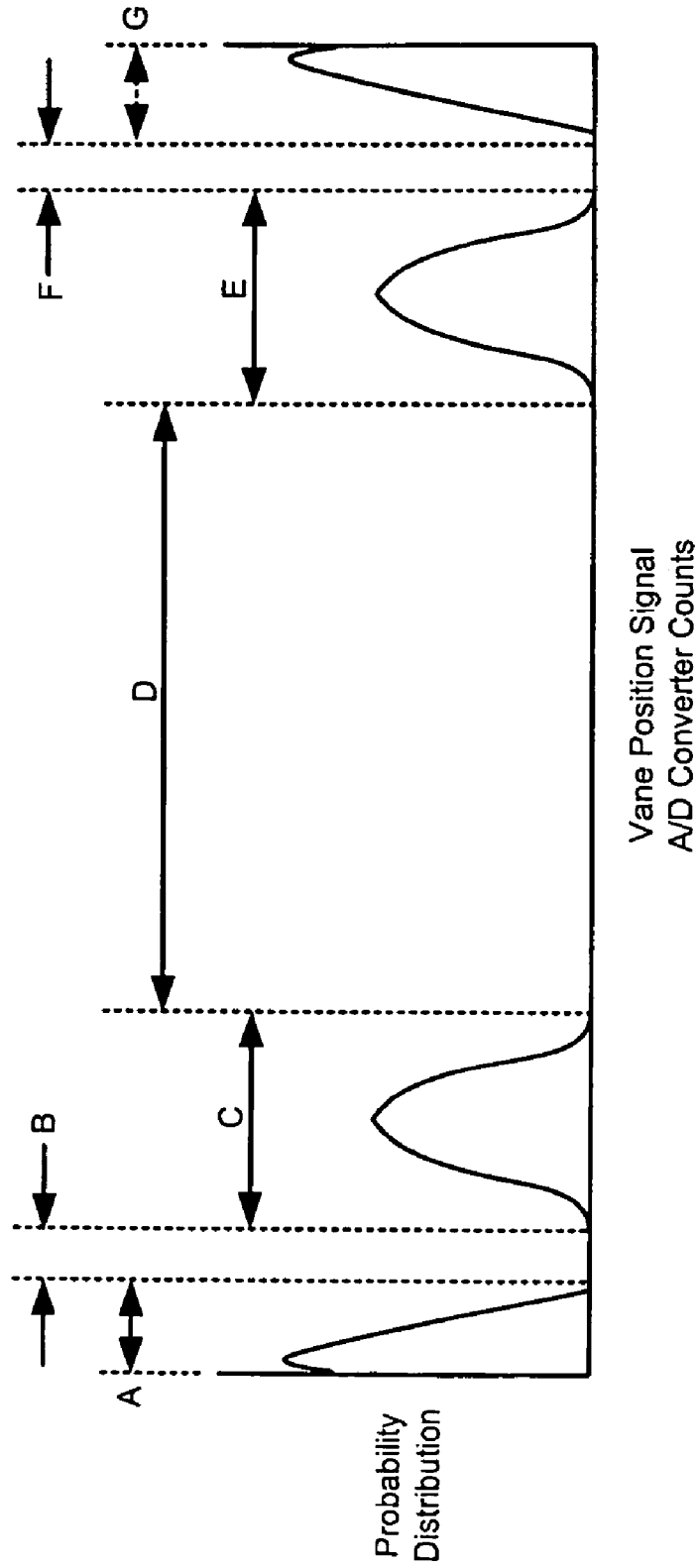
FIG. 3 is a graph illustrating probability distributions for sensor signals based on an output of the diagnostic limit determination system.

Referring now to FIGS. 2 and 3, the mechanical input PDFs are generated in step 100. Component models for each component of the vane position sensing system are generated in step 102. In step 104, parameter PDFs are generated for the parameters associated with each of the component models. The mechanical input PDFs, component models and parameter PDFs are processed using MCA in step 106. More particularly, random samples are taken from each of the parameter PDFs and a series of vane position signals are generated for the vane position sensing system in step 108. The vane position signals define the vane position signal PDFs. The vane position signal PDFs are plotted in the graph of FIG. 3. In step 110, the fully-open and fully-closed diagnostic limits are determined based on the vane position signal PDFs. In step 112, the span diagnostic limits are determined.

With particular reference to FIG. 3, the vane position signal PDFs define multiple regions A, B, C, D, E, F and G. Regions A, B, F and G are fault regions. If a vane position signal were to lay within regions A, B, F or G, the vane position system is faulty. More particularly, regions A and G typically indicate an electrical fault and regions B and F typically indicate mechanical faults. Region C indicates the fully-open region and region E indicates the fully-closed region. When commanded to the fully-open position, the vane position is considered fully-open if the vane position signal were to lie within region C. When commanded to the fully-closed position, the vane position is considered fully-closed if the vane position signal were to lie within region E. Region D indicates the intermediate vane positions between fully-open and fully-closed.

The multiple regions are converted into diagnostic limits for the sensor diagnostic of the present invention. The upper limit for the fully-open diagnostic region and the lower limit for the fully-closed diagnostic region are based on a statistical Z-score being above a specified threshold value (e.g., 4.5). A Z-score is a standard metric that describes success rate based on statistical distributions. More particularly, the Z-score indicates how far and in what direction the vane position signal deviates from its distribution's mean, expressed in units of its distribution's standard deviation.

The lower limit for the fully-open diagnostic region and the upper limit for the fully-closed diagnostic region are determined by false diagnostic pass and false diagnostic fail rates for specific wiring harness faults. More specifically, either the fully-open or fully-closed probability distribution are selected such that the result gives the highest amount of probability density function overlap area between the no-fault mode and a specific fault mode distribution. The corresponding diagnostic limit is established by minimizing the overlap area from these two distributions. In general, the fully-open and fully-closed diagnostic regions collapse regions B and F. The lower limit for the fully-open diagnostic region lies in the area between regions A and C (i.e., formerly region B). The upper limit for the fully-closed diagnostic range lies in the area between regions E and G (i.e., formerly region F).

The span diagnostic limits are established based on requirements of the VNT control system. More particularly, the upper and lower span diagnostic limits are based on resolution requirements, control system stability and allowable system hysteresis. To establish the span range diagnostic limits, the span range is determined to provide an acceptable control system response (e.g. overshoot, surge control, or position error) over the entire operating range of the engine control system (i.e. temperature, barometric pressure, and inlet or outlet flow restrictions). The maximum span range value defines the upper span diagnostic limit. The minimum span range is determined to provide an acceptable control system response. The minimum span range value defines the lower diagnostic span limit. In general, the span diagnostic limits are determined independently of the vane position signal PDFs.

Figure 4:
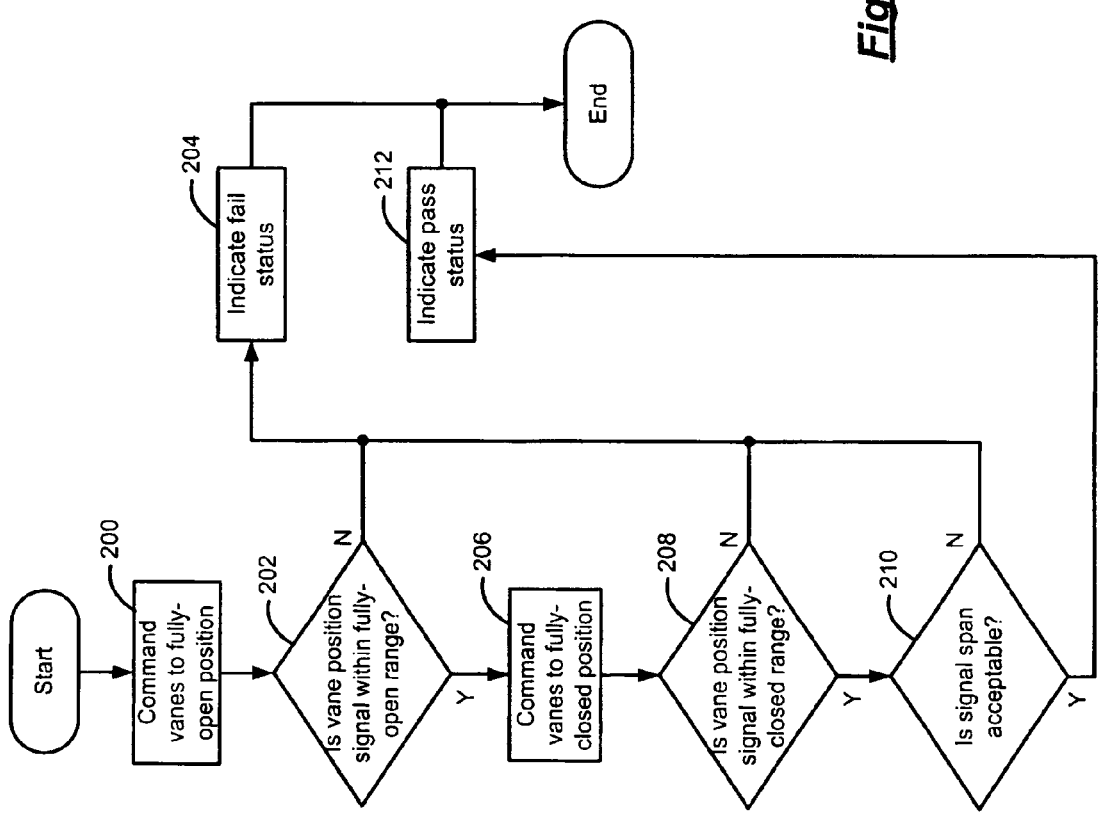
FIG. 4 is a flowchart illustrating steps of a vane positioning diagnostic system according to the present invention.

Referring now to FIG. 4, the developed diagnostic limits are implemented in the vane position system diagnostic. In step 200, control logic commands the vane actuator 28 to move the vanes to the fully-open position. Diagnostic logic determines whether the vane position signal lies within the fully-open diagnostic region in step 202. If the vane position signal does not lie within the fully-open diagnostic region, a fail status is indicated in step 204 and the diagnostic logic ends. If the vane position signal does lie within the fully-open diagnostic region, diagnostic logic continues in step 206.

In step 206, control logic commands the actuator to move the vanes to the fully-closed position. Diagnostic logic determines whether the vane position signal lies within the fully-closed diagnostic region in step 208. If the vane position signal does not lie within the fully-closed diagnostic region, a fail status is indicated in step 204 and the diagnostic logic ends. If the vane position signal does lie within the fully-closed diagnostic region, the diagnostic logic continues in step 210.

In step 210, the diagnostic logic determines whether the signal span value is within the span diagnostic limits. That is to say, the diagnostic logic looks at the difference between the fully-open and fully-closed signals and determines whether the difference is within the span diagnostic limits. If the signal span value is within the span diagnostic limits, the diagnostic logic indicates a pass status for the vane position system in step 212 and the diagnostic ends. If the signal span value is not within the span diagnostic limits, diagnostic logic indicates a fail status in step 204 and the diagnostic logic ends.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of determining diagnostic limits for a vane position sensing system installed in a variable nozzle turbocharger (VNT), comprising:
   defining mechanical input probability distribution functions (PDFs) of said VNT;
   describing said vane position sensing system in terms of component models;
   defining component parameter PDFs for parameters associated with said component models;
   generating vane position signal PDFs based on said mechanical input PDFs, said component models and said component parameter PDFs; and
   setting diagnostic limits for said vane position sensing system based on said vane position signal PDFs.

2. The method of claim 1 wherein said step of generating vane position signal PDFs includes processing said component parameter PDFs and said component models using Monte Carlo Analysis (MCA).

3. The method of claim 1 wherein said component models include a control circuit model and a signal processing model and said step of defining said component parameter PDFs includes processing said control circuit model and said signal processing model using Monte Carlo Analysis (MCA).

4. The method of claim 1 wherein said step of generating said vane position signal PDFs includes processing said component parameter PDFs, a vane position sensor model, a wiring harness model, a control circuit model and a signal processing model using Monte Carlo Analysis (MCA).

5. The method of claim 1 wherein said step of setting said diagnostic limits includes:
   determining a fully-open sensor position range based on said vane position signal PDFs and said mechanical input PDFs; and
   determining a fully-closed sensor position range based on said vane position signal PDFs and said mechanical input PDFs.

6. The method of claim 5 wherein said step of setting said diagnostic limits further includes defining a span limit between said fully-open and said fully-closed sensor position ranges based on resolution, control stability and allowable hysteresis.

7. A method of diagnosing operation of a vane position sensing system of a variable nozzle turbocharger (VNT), comprising:
   generating a vane position signal probability distribution functions (PDFs) based on a vane position sensor model and model parameter PDFs;
   determining fully-open and fully-closed diagnostic regions for said vane position sensor based on said vane position signal PDFs;
   commanding vanes of said VNT to a fully-open position;
   comparing a fully-open sensor signal to said fully-open diagnostic region;
   commanding vanes of said VNT to a fully-closed position; and
   comparing a fully-closed sensor signal to said fully-closed diagnostic region.

8. The method of claim 7 further comprising generating a fault signal if said fully-open sensor signal does not lie within said fully-open diagnostic region.

9. The method of claim 7 further comprising generating a fault signal if said fully-closed sensor signal does not lie within said fully-closed diagnostic region.

10. The method of claim 7 further comprising:
determining a signal span between said fully-open sensor signal and said fully-closed sensor signal; and
comparing said signal span to a span diagnostic region.

11. The method of claim 10 further comprising generating a fault signal if said signal span does not lie within said span diagnostic region.

12. The method of claim 10 further comprising generating a pass signal if said fully-open sensor signal lies within said fully-open diagnostic region, if said fully-closed sensor signal lies within said fully-closed diagnostic region and if said signal span lies within said span diagnostic region.

13. The method of claim 7 wherein said step of generating said vane position signal PDFs includes processing said model parameter PDFs and said vane position sensor model, a wiring harness model, a control circuit model and a signal processing model using Monte Carlo Analysis (MCA).

14. The method of claim 7 wherein said step of determining said fully-open and fully-closed diagnostic regions includes:
defining minimum and maximum limits of said fully-open diagnostic region based on said vane position signal PDFs; and
defining minimum and maximum limits of said fully-closed diagnostic region based on said vane position signal PDFs.

15. The method of claim 14 further comprising determining a signal span diagnostic region between said fully-open and said fully-closed diagnostic regions.

16. A method of determining diagnostic limits for a vane position sensing system, comprising:
describing components of said vane position sensing system in terms of component models;
defining component parameter probability distribution functions (PDFs) for parameters associated with each of said component models;
defining mechanical input PDFs;
generating sensor position signal PDFs based on said component models, said component parameter PDFs and said mechanical input PDFs; and
setting diagnostic limits for said position sensing system based on said sensor position PDF.

17. The method of claim 16 wherein said mechanical input PDFs are based on mechanical parameters associated with a mechanical system monitored by said vane position sensing system.

18. The method of claim 16 wherein said step of generating said sensor position signal PDFs includes processing said component parameter PDFs, said component models and said mechanical input PDFs using Monte Carlo Analysis (MCA).

19. The method of claim 16 wherein said component models include a position sensor model and a wiring harness model.

20. The method of claim 19 wherein said component models further include a signal processing model and a control circuit model.

21. The method of claim 16 wherein said step of setting said diagnostic limits includes:
defining a first sensor position range based on said sensor position signal PDF; and
defining a second sensor position range based on said sensor position signal PDF.

22. The method of claim 21 wherein said step of setting said diagnostic limits further includes defining a span limit between said first and second sensor position ranges.

* * * * *